(12) United States Patent
Cho

(10) Patent No.: US 12,325,406 B2
(45) Date of Patent: Jun. 10, 2025

(54) BRAKING CONTROL SYSTEM AND METHOD FOR VEHICLE

(71) Applicants: Hyundai Motor Company, Seoul (KR); Kia Motors Corporation, Seoul (KR)

(72) Inventor: Hee Jin Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 232 days.

(21) Appl. No.: 17/093,850

(22) Filed: Nov. 10, 2020

(65) Prior Publication Data

US 2021/0354671 A1 Nov. 18, 2021

(30) Foreign Application Priority Data

May 18, 2020 (KR) .................. 10-2020-0058810

(51) Int. Cl.
*B60T 8/58* (2006.01)
*B60Q 9/00* (2006.01)
*B60T 8/171* (2006.01)
*B60T 8/172* (2006.01)
*B60T 8/26* (2006.01)
*B60T 8/32* (2006.01)
*B60T 8/34* (2006.01)

(52) U.S. Cl.
CPC .................. *B60T 8/58* (2013.01); *B60Q 9/00* (2013.01); *B60T 8/171* (2013.01); *B60T 8/172* (2013.01); *B60T 8/26* (2013.01); *B60T 8/321* (2013.01); *B60T 8/34* (2013.01); *B60T 2210/12* (2013.01); *B60T 2240/00* (2013.01); *B60T 2250/00* (2013.01)

(58) Field of Classification Search
CPC . B60T 8/58; B60T 8/171; B60T 8/172; B60T 8/26; B60T 8/321; B60T 8/34; B60T 2210/12; B60T 2240/00; B60T 2250/00; B60Q 9/00
See application file for complete search history.

(56) References Cited

U.S. PATENT DOCUMENTS

| 6,125,318 | A | * | 9/2000 | Zierolf | B64C 25/44 |
| | | | | | 701/91 |
| 2006/0131950 | A1 | * | 6/2006 | Larson | B60T 8/00 |
| | | | | | 303/7 |
| 2008/0262692 | A1 | * | 10/2008 | Kogure | B60W 40/068 |
| | | | | | 701/90 |

FOREIGN PATENT DOCUMENTS

| DE | 102008032544 A1 * | 2/2009 | ......... B60T 8/17616 |
| JP | 2015-196418 A | 11/2015 | |

(Continued)

OTHER PUBLICATIONS

Machine English Translation of DE-102008032544-A1 (Year: 2009).*
English Machine Translation of JP-6480729-B2 (Year: 2014).*

*Primary Examiner* — Andrew J Cromer
(74) *Attorney, Agent, or Firm* — Fox Rothschild LLP

(57) ABSTRACT

A braking control system and method for a vehicle are configured to calculate a braking force of front and rear wheels using a wheel slip ratio of the front and rear wheels and a road surface friction coefficient and then accurately estimate and calculate a disk temperature of the front and rear wheels using a predetermined estimation formula from the calculated braking force, and control distribution of braking pressure to the front wheels and the rear wheels so as to uniformly wear brake pads based on the calculated temperatures of the disks.

20 Claims, 4 Drawing Sheets

(56) References Cited

FOREIGN PATENT DOCUMENTS

| | | | |
|---|---|---|---|
| JP | 2018-001824 | A | 1/2018 |
| JP | 6480729 | B2 * | 3/2019 |
| KR | 2011-0125130 | A | 11/2011 |
| KR | 101142361 | B1 | 5/2012 |
| KR | 101417866 | B1 | 7/2014 |
| KR | 2015-0124587 | A | 11/2015 |
| KR | 2015-0134062 | A | 12/2015 |
| KR | 101897466 | B1 | 9/2018 |
| KR | 2019-0015855 | A | 2/2019 |
| KR | 2019-0030858 | A | 3/2019 |
| KR | 2019-0035124 | A | 4/2019 |

* cited by examiner

BRAKING CONTROL SYSTEM AND METHOD FOR VEHICLE

CROSS-REFERENCE TO RELATED APPLICATION

This application claims under 35 U.S.C. § 119(a) the benefit of Korean Patent Application No. 10-2020-0058810 filed on May 18, 2020, the entire contents of which are incorporated herein by reference.

BACKGROUND

(a) Technical Field

The present disclosure relates to a braking control system and method for a vehicle, more particularly, to the braking control system and method for a vehicle for accurately calculating the temperature of brake disks of front wheels and rear wheels using braking force calculated using a wheel slip ratio of the front and rear wheels and a road surface friction coefficient and controlling the distribution of braking pressure to the front wheels and the rear wheels so as to uniformly wear brake pads based on the calculated temperature of the brake disks.

(b) Description of the Related Art

As is well known, braking of a vehicle is performed by a procedure of providing hydraulic pressure to a wheel cylinder of a caliper, a procedure of pressurizing a brake pad by a piston member of the wheel cylinder, and a procedure of frictional contact between the brake pad and a surface of a brake disk, rotated together with a tire.

A friction coefficient of the brake disk (hereinafter, referred to as a disk) continuously or nonlinearly changes depending on a temperature of the disk, magnitude of hydraulic pressure applied to the disk from the wheel cylinder and the brake pad, a rotation speed of the disk based on a vehicle speed, and the like.

Also, brake pads applied to right and left front wheels and right and left rear wheels typically are subjected to different amounts of wear.

Thus, conventionally, there is applied a method of detecting wear of respective brake pads applied to front wheels and rear wheels by a separate lining wear sensor installed in a vehicle and compensating for distribution of braking pressure to the front wheels and rear wheels based on the detected wear of the brake pads.

However, there are problems in terms of increased manufacturing costs, and issues related to the quality of a lining wear sensor (e.g., damage or heat damage thereto, or malfunction thereof) due to use of the lining wear sensor.

In addition, conventionally, there is applied a method of calculating a temperature variation of a disk and a current temperature of the disk based on an outdoor temperature and a distributing braking force depending on the calculated temperature of the disk, but it is difficult to accurately calculate the temperature of the disk depending on a change in the outdoor temperature, and as a result, disadvantageously, the braking force is not accurately distributed in accordance with the calculated temperature of the disk.

SUMMARY

In one aspect, the present disclosure provides a braking control system and method for a vehicle for calculating the braking force of front and rear wheels using a wheel slip ratio of front and rear wheels and a road surface friction coefficient and then accurately estimating and calculating a disk temperature of the front and rear wheels using a predetermined estimation formula from the calculated braking force, and controlling the distribution of braking pressure to the front wheels and the rear wheels so as to uniformly wear brake pads based on the calculated temperature of the disks.

In a preferred embodiment, a braking control system for a vehicle includes a wheel speed sensor configured to detect a wheel speed of front wheels and rear wheels, and a controller configured to sequentially perform calculating a wheel slip ratio based on a wheel speed signal detected by the wheel speed sensor, extracting a road surface friction coefficient matching the calculated wheel slip ratio from mapping table data, calculating braking force of the front wheels and the rear wheels using vehicle data information in addition to the extracted road surface friction coefficient, calculating temperatures of disks of the front wheels and the rear wheels using the calculated braking force of the front wheels and the rear wheels and a disk temperature estimation formula, and controlling a distribution of braking pressure to the front wheels and the rear wheels based on a calculated temperature difference between the disks of the front wheels and the rear wheels.

The controller may be configured to sequentially perform calculating disk braking force energy, calculating disk input energy including disk braking force energy, calculating an increased disk temperature, calculating a disk temperature change, and calculating a disk temperature by subtracting the disk temperature change from a previous disk temperature, and may be configured to calculate a disk temperature of the front wheels and the rear wheels.

When a difference between an average of temperatures of right and left disks of the front wheels and an average of temperatures of right and left disks of the rear wheels is greater than a reference value, the controller may be configured to control the distribution of the braking pressure to the front wheels and the rear wheels.

When comparing a deceleration value of a vehicle with a reference value and verifying that the deceleration value corresponds to a high deceleration greater than the reference value, the controller may be configured to stop control of the distribution of the braking pressure to the front wheels and the rear wheels.

After calculating a disk temperature of the front wheels and the rear wheels, when determining that the calculated disk temperature is equal to or greater than a maximum temperature of the disk, the controller may be configured to perform control to turn on a warning light of a cluster in order to prevent a hard braking operation by a driver.

In another preferred embodiment, a braking control method for a vehicle includes detecting a wheel speed of front wheels and rear wheels, calculating a wheel slip ratio based on a wheel speed signal detected by a wheel speed sensor, extracting a road surface friction coefficient matching the calculated wheel slip ratio from mapping table data, calculating braking force of the front wheels and the rear wheels using vehicle data information in addition to the extracted road surface friction coefficient, calculating temperatures of disks of the front wheels and the rear wheels using the calculated braking force of the front wheels and the rear wheels and a disk temperature estimation formula, and controlling a distribution of braking pressure to the front wheels and the rear wheels based on a calculated temperature difference between the disks of the front wheels and the rear wheels.

The calculating of the disk temperature of the front wheels and the rear wheels may be performed by sequentially performing calculating disk braking force energy, calculating disk input energy including disk braking force energy, calculating an increased disk temperature, calculating a disk temperature change, and subtracting the disk temperature change from a previous disk temperature.

The controlling of the distribution of braking pressure to the front wheels and the rear wheels may be performed when a difference between an average of temperatures of right and left disks of the front wheels and an average of temperatures of right and left disks of the rear wheels is greater than a reference value.

The method may further include, when comparing a deceleration value of a vehicle with a reference value and verifying that the deceleration value corresponds to a high deceleration greater than the reference value, stopping control of distribution of the braking pressure to the front wheels and the rear wheels.

The method may further include, after calculating a disk temperature of the front wheels and the rear wheels, when determining that the calculated disk temperature is equal to or greater than a maximum temperature of the disk, performing control to turn on a warning light of a cluster in order to prevent a hard braking operation by a driver.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

DETAILED DESCRIPTION

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present disclosure, examples of which are illustrated in the accompanying drawings and described below.

Figure 1:
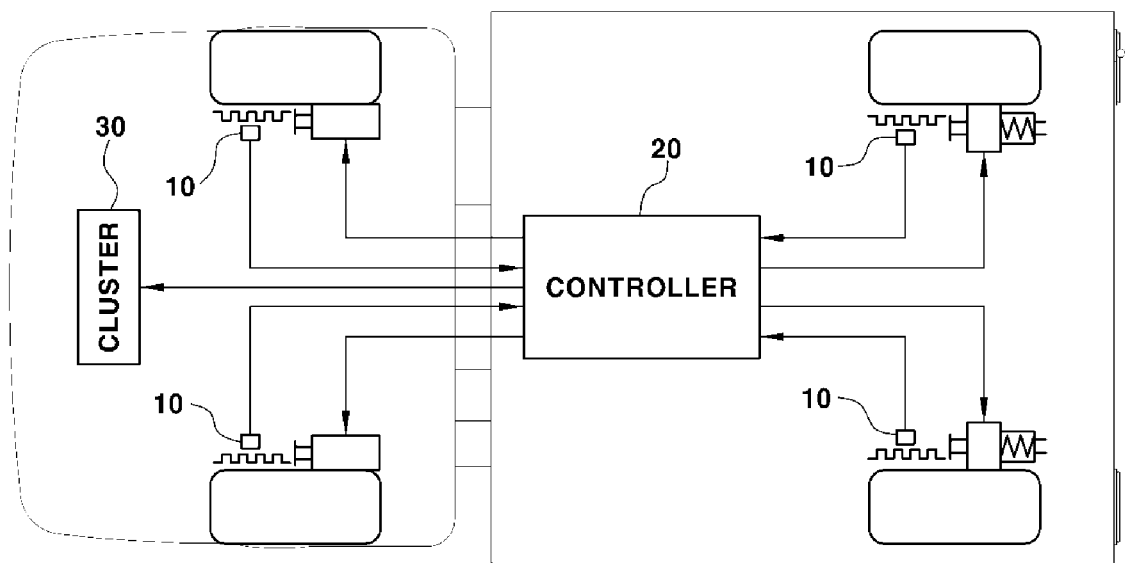
FIGS. 1 and 2 are diagrams showing the structure of a braking control system for a vehicle according to the present disclosure.

FIG. 1 is a diagram showing an example of a structure of a braking control system for a vehicle according to the present disclosure, in which reference numeral 10 denotes a wheel speed sensor.

The wheel speed sensor 10 may be installed at a position close to each of front wheels and rear wheels, may detect the wheel speed of each of the front wheels and the rear wheels, and may transmit the detected wheel speed to a controller 20.

The controller 20 may be configured to sequentially perform a procedure of calculating a wheel slip ratio based on the wheel speed detected by the wheel speed sensor 10, a procedure of extracting a road surface friction coefficient matching the calculated wheel slip ratio from mapping table data, a procedure of calculating the braking force of the front wheels and the rear wheels using vehicle data information as well as the extracted road surface friction coefficient, a procedure of calculating the temperature of disks of the front wheels and the rear wheels using the calculated braking force of the front wheels and the rear wheels and a disk temperature estimation formula, and a control procedure of distributing braking pressure to the front wheels and the rear wheels based on the calculated temperature of the disks of the front wheels and the rear wheels.

A cluster 30 for warning a driver of a hard braking operation by turning on a warning light may be connected to an output end of the controller 20.

Figure 2:
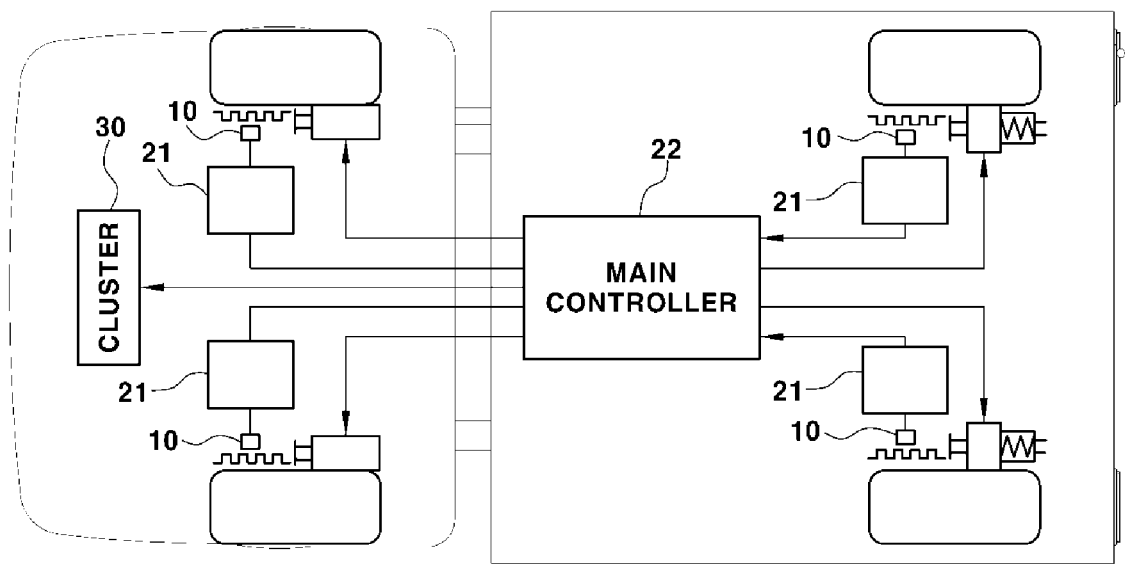
Figure 3:
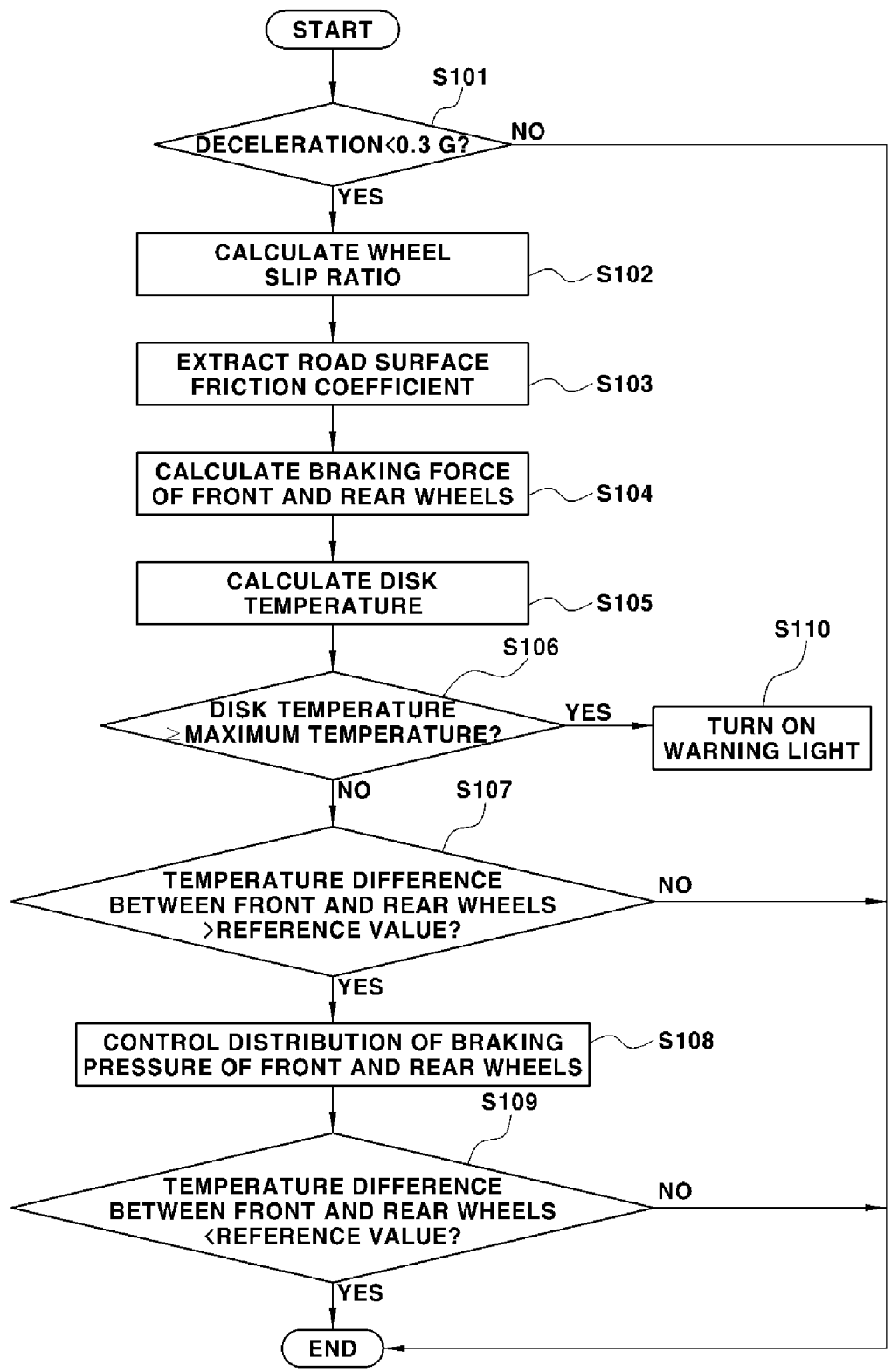
FIG. 3 is a flowchart showing a braking control method for a vehicle according to the present disclosure.

FIG. 2 is a diagram showing another example of the structure of a braking control system for a vehicle according to the present disclosure, in which reference numeral 10 denotes a wheel speed sensor.

The wheel speed sensor 10 may be installed at a position close to each of front wheels and rear wheels, may detect the wheel speed of each of the front wheels and the rear wheels and may transmit the detected wheel speed to a wheel controller 21.

The wheel controller 21 may be configured to calculate a wheel slip ratio based on the wheel speed detected by the wheel speed sensor 10, to extract a road surface friction coefficient matching the calculated wheel slip ratio from mapping data, and to transmit the extracted road surface friction coefficient to a main controller 22.

The main controller 22 may be configured to sequentially perform a procedure of calculating the braking force of the front wheels and the rear wheels using vehicle data information as well as the road surface friction coefficient transmitted from the wheel controller 21, a procedure of calculating the temperature of the disks of the front wheels and the rear wheels using the calculated braking force of the front wheels and the rear wheels and a disk temperature estimation formula, and a control procedure of distributing braking pressure to the front wheels and the rear wheels based on the calculated temperature of the disks of the front wheels and the rear wheels.

The cluster 30 for warning a driver of a hard braking operation by turning on a warning light may be connected to an output end of the main controller 22.

As such, braking control related to the present disclosure may be performed by a plurality of controllers including the wheel controller 21, the main controller 22, and the like, or may be performed by a single integration-type controller 20, and hereinafter, to aid in understanding the present disclosure, an example of the single integrated-type controller 20 is used will be described.

First, a signal obtained by detecting the wheel speed of each of the front wheels and the rear wheels by the wheel speed sensor 10 when a vehicle decelerates may be transmitted to the controller 20.

Then, the controller 20 may calculate a wheel slip ratio of the front wheels and the rear wheels based on the wheel speed signal transmitted from the wheel speed sensor 10 using Equation 1 below (S102).

Wheel slip ratio=[(vehicle speed−wheel speed)/vehicle speed]*100(%)     [Equation 1]:

In Equation 1 above, the vehicle speed may be defined as the average of wheel speeds of the front wheels and the rear wheels.

Then, the road surface friction coefficient matching the wheel slip ratio may be extracted from mapping table data (S103).

That is, the controller 20 may extract the road surface friction coefficient matching the wheel slip ratio calculated using Equation 1 above from the mapping table data.

Figure 4:
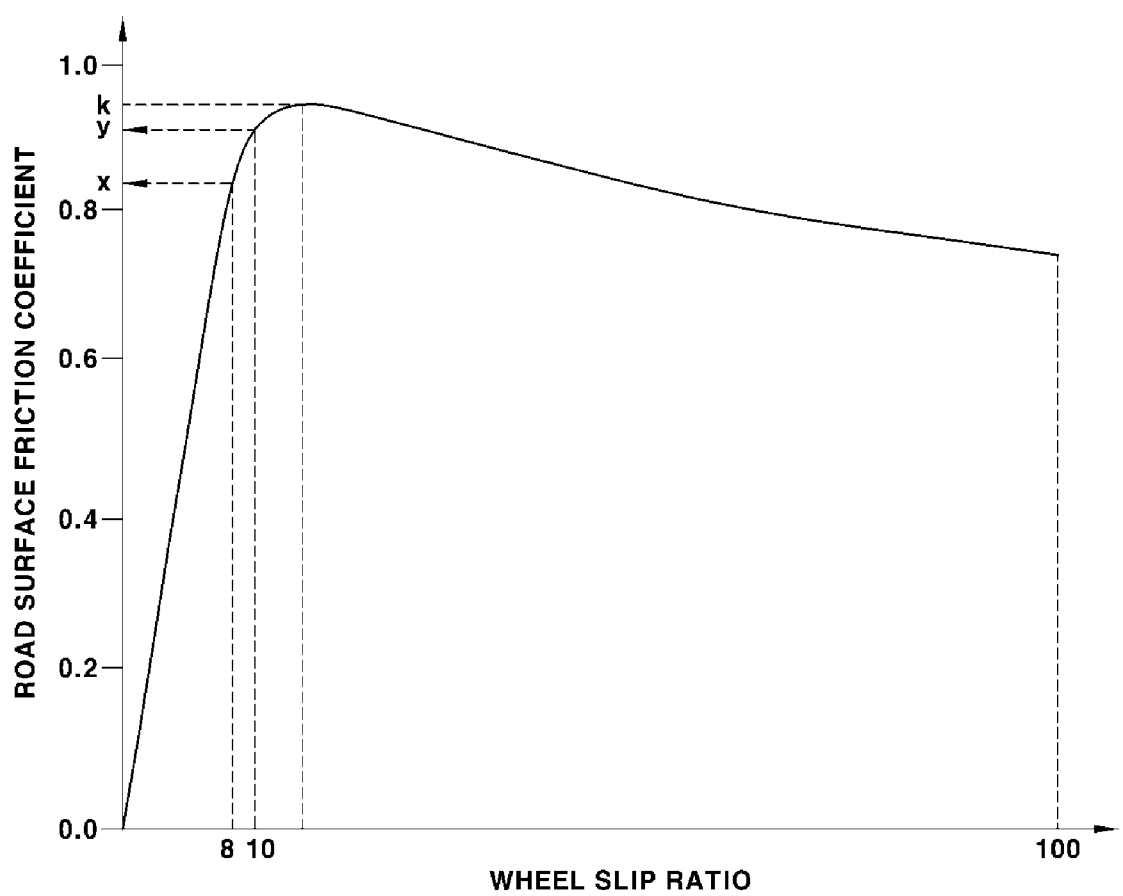
FIG. 4 is a graph showing an example of mapping data used to extract a road surface friction coefficient by a controller of a braking control system according to the present disclosure.
Figure 5:
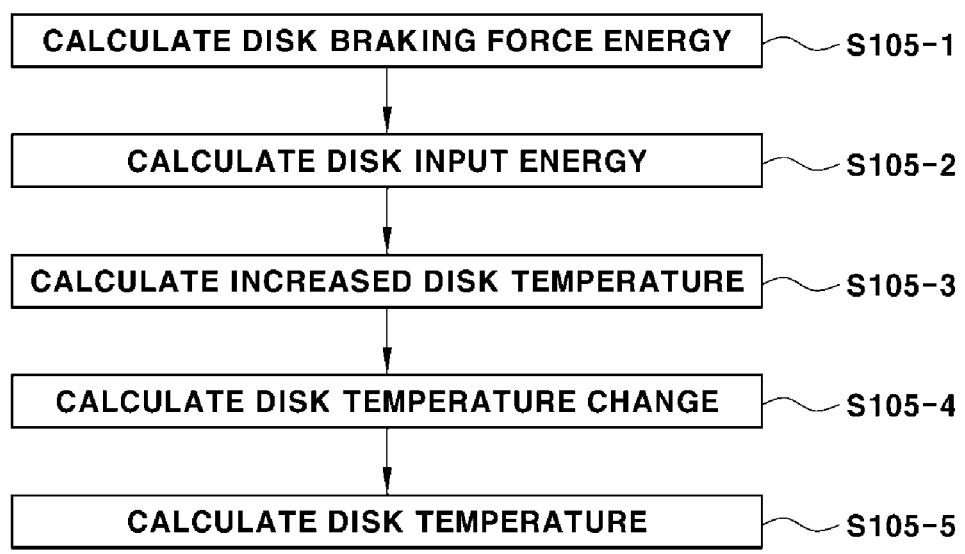
FIG. 5 is a flowchart showing a procedure of calculating a disk temperature using a controller of a braking control system for a vehicle according to the present disclosure.

As shown in FIG. 4, the mapping table data may be 2-D mapping data that is established in advance by evaluating a friction coefficient between a tire and a road surface in comparison with a wheel slip ratio provided by a tire company during development of a vehicle, or may be 2-D mapping data that is established in advance by measuring a friction coefficient between a tire and a road surface compared with a wheel slip ratio during a vehicle braking and tuning test, and may be stored in a memory unit of the controller 20.

Then, the controller 20 may calculate the braking force of the front wheels and the rear wheels from the road surface friction coefficient extracted from the mapping table data and vehicle data information (S104).

For example, the front-wheel braking force and the rear-wheel braking force may be calculated using Equations 2 and 3, each of which is used calculate a road surface friction coefficient.

$$\mu_{TF} = \frac{F_{xF}}{W_F + \frac{h}{L} \cdot W \cdot a} \quad \text{[Equation 2]}$$

In Equation 2 above, $\mu_{TF}$ is the road surface friction coefficient of a front wheel, $W_F$ is the axial load of the front wheel, h is the height to the center of gravity of the vehicle from the road surface, L is the distance between centers of tires of the front wheel and the rear wheel (i.e., a wheelbase), W is a vehicle weight, a is deceleration, and in particular, $F_{xF}$ is front-wheel braking force.

Thus, the controller 20 is aware of the road surface friction coefficient $\mu_{TF}$ of the front wheel, extracted in operation S103, is aware of the front wheel axial load $W_F$, which is the vehicle data information, the height h to the center of gravity of a vehicle from the road surface, the distance L (wheelbase) between the centers of tires of the front wheel and the rear wheel, and the vehicle weight W, and is aware of deceleration 'a' through the wheel speed signal transmitted from the wheel speed sensor, and thus may calculate the front-wheel braking force $F_{xF}$.

$$\mu_{TR} = \frac{F_{xR}}{W_R - \frac{h}{L} \cdot W \cdot a} \quad \text{[Equation 3]}$$

In Equation 3 above, $\mu_{TR}$ is the road surface friction coefficient of the rear wheel, $W_R$ is an axial load of the rear wheel, h is the height to the center of gravity of the vehicle from the road surface, L is the distance (a wheelbase) between centers of tires of the front wheel and the rear wheel, W is the vehicle weight, a is deceleration, and in particular, $F_{xR}$ is rear-wheel braking force.

Thus, the controller 20 is aware of the road surface friction coefficient $\mu_{TR}$ of the rear wheel, extracted in operation S103, is aware of the front wheel axial load $W_F$ as the vehicle data information, the height h to the center of gravity of the vehicle from the road surface, the distance (wheelbase) between the centers of tires of the front wheel and the rear wheel, and the vehicle weight W, and is aware of the deceleration 'a' through the wheel speed signal transmitted from the wheel speed sensor, and thus, may calculate the rear-wheel braking force $F_{xR}$.

Then, the controller 20 may calculate the temperature of the disk of each of the front wheels and the rear wheels using the braking force of the front wheels and the rear wheels, calculated in operation S104, and a predetermined disk temperature estimation formula (S105).

Here, procedures of calculating the temperature of disks of the front wheels and the rear wheels will be sequentially described.

First, disk braking force energy may be calculated using the braking force of the front wheels and the rear wheels, calculated in operation S104, according to Equation 4 below (S105-1).

Disk braking force energy=front-wheel braking force/(front-wheel braking force+rear-wheel braking force)×total energy     [Equation 4]:

In Equation 4 above, the total energy may be the kinetic energy (½ ms²) of a vehicle, in which case the mass 'm' may be determined as the gross vehicle weight (GVW), and the speed S may be determined as the value measured by a wheel speed sensor.

Then, disk input energy, including the disk braking force energy calculated using Equation 4 above, may be calculated using Equation 5 below (S105-2).

Disk input energy=disk braking force energy×disk energy     [Equation 5]:

In Equation 5 above, the disk energy may refer to self-energy, determined depending on the physical property data of a disk and a pad.

Then, an increased disk temperature may be calculated using Equation 6 below into which the disk input energy, calculated using Equation 5 above, is inserted (S105-3).

Increased disk temperature=disk input energy/(disk weight×disk heat capacity)  [Equation 6]:

In Equation 6 above, the disk weight may be recognized through vehicle data information, and disk heat capacity may be unique physical property data of the material of the disk, and may be a value determined through a component test or an experience point, a disk temperature change may be calculated using Equation 7 below into which the increased disk temperature, calculated using Equation 6 above is inserted (S105-4).

Disk temperature change=cool disk temperature−increased disk temperature  [Equation 7]:

In Equation 7 above, the cool disk temperature may be calculated using Equation 8 below.

Cool disk temperature=cooling coefficient/(disk weight×disk heat capacity)  [Equation 8]:

In Equation 8 above, the cooling coefficient may be calculated using Equation 9 below.

Cooling coefficient=convective heat transfer coefficient×disk cross-sectional area  [Equation 9]:

In Equation 9 above, the convective heat transfer coefficient of the disk maybe determined as an experimental value or an experience point, and the disk cross-sectional area may be obtained from the vehicle data information.

Thus, the cool disk temperature may be calculated by inserting the cooling coefficient, calculated using Equation 9 above, into Equation 8 above and the disk temperature change may be calculated by inserting the cool disk temperature, calculated using Equation 8 above, into Equation 7 above.

Lastly, a disk temperature may be calculated using Equation 10 below into which the disk temperature change calculated using Equation 7 above is inserted (S105-5).

Disk temperature=previous disk temperature−disk temperature change  [Equation 10]:

In Equation 10 above, the previous disk temperature may be a disk temperature calculated in previous braking, and an initial previous disk temperature may be a constant that is set through a tuning test during a vehicle test.

As such, in operation S105, the disk temperature of the front wheels and the rear wheels may be calculated using a predetermined equation formula such as Equations 4 to 10.

Then, in operation S105, as a procedure after calculations pertaining to the disks of the front wheels and the rear wheels, a control procedure of distributing braking pressure to the front wheels and the rear wheels based on the disk temperature of the front wheels and the rear wheels, calculated using a predetermined estimation formula such as Equations 4 to 10, may be performed.

To this end, first, the difference between the average of the temperatures of right and left disks of the front wheels and the average of the temperatures of the right and left disks of the rear wheels may be compared with a reference value (e.g., 15%) (S107).

As a comparison result, when the difference between the average of temperatures of the right and left disks of the front wheels and the average of temperatures of the right and left disks of the rear wheels is greater than the reference value, the control procedure of distributing braking pressure to the front wheels and the rear wheels may be performed (S108).

For example, when the difference between the average of temperatures of the right and left disks of the front wheel and the average of temperatures of the right and left disks of the rear wheel is greater than the reference value, control of changing the braking-pressure ratio of the front wheel to the rear wheel to 1.3:1.0 from 1.1:1.0 and distributing braking pressure to the front wheel and the rear wheel based thereon may be performed.

Test Example 1

(1) Test Conditions

The test conditions are an on-state in which a hydraulic brake as a main brake of a medium-sized truck is operated and an on-state in which an exhaust brake, as an auxiliary brake, is operated in the state in which the difference between the average of the temperatures of right and left disks of the front wheels of the medium-sized truck and the average of the temperatures of right and left disks of the rear wheels is greater than a reference value.

(2) Test Method

Braking pressure is distributed to the front wheel and the rear wheel in the state in which a braking-pressure ratio of the front wheel to the rear wheel is set to 1.1:1.0, and then, after a predetermined time, a temperature increase amount of a brake pad that frictionally contacts a disk is measured, and the braking pressure is distributed to the front wheel and the rear wheel in the state in which the braking-pressure ratio of the front wheel to the rear wheel is changed to 1.3:1.0, and then, after a predetermined time, the temperature increase amount of the brake pad that frictionally contacts the disk is measured, and accordingly, the results are shown in Table 1 below.

TABLE 1

| Brake device | Braking-pressure ratio (Fr/Rr) | Measurement target (Brake PAD) | Test Result Pad temperature difference (Fr − Rr) |
|---|---|---|---|
| Hydraulic brake ON & Exhaust brake ON | 1.1:1.0 | Front Rear | −58.6° C. |
| | 1.3:1.0 | Front Rear | −0° C. |

As seen from Table 1 above, in an on-state condition in which a hydraulic brake and an exhaust brake are operated, the temperature difference (−0.9° C.) between front and rear wheel pads is remarkably reduced in the state in which the braking-pressure ratio of the front wheel to the rear wheel is set to 1.3:1.0, compared with a temperature difference (−58.6° C.) between the front and rear wheel pads in the state in which the braking-pressure ratio of the front wheel to the rear wheel is set to 1.1:1.0.

The result proves uniform frictional-contact between disks and brake pads of the front wheels and the rear wheels, and as a result, proves uniform wear of the brake pads.

Test Example 2

(1) Test Conditions

Test Condition is an on-state in which only a hydraulic brake as a main brake of a medium-sized truck is operated in a state in which a difference between the average of temperatures of right and left disks of a front wheel of the medium-sized truck and the average of temperatures of right and left disks of a rear wheel is greater than a reference value.

(2) Test Method

Like in Test Example 1, braking pressure is distributed to the front wheel and the rear wheel in a state in which a braking-pressure ratio of the front wheel to the rear wheel is set to 1.1:1.0, and then, after a predetermined time, a temperature increase amount of a brake pad that frictionally contacts a disk is measured, and the braking pressure is distributed to the front wheel and the rear wheel in a state in which the braking-pressure ratio of the front wheel to the rear wheel is changed to 1.3:1.0, and then, after a predetermined time, the temperature increase amount of the brake pad that frictionally contacts the disk is measured, and accordingly, the results are shown in Table 2 below.

TABLE 2

| Brake device | Braking-pressure ratio (Fr/Rr) | Measurement target (Brake PAD) | Test Result Pad temperature difference (Fr − Rr) |
|---|---|---|---|
| Hydraulic brake ON | 1.1:1.0 | Front Rear | −141.7° C. |
| | 1.3:1.0 | Front Rear | −85.4° C. |

As seen from Table 2 above, in an on-state condition in which only a hydraulic brake is operated, a temperature difference (−85.4° C.) between front and rear wheel pads is remarkably reduced in the state in which the braking-pressure ratio of the front wheel to the rear wheel is set to 1.3:1.0, compared with a temperature difference (−141.7° C.) between the front and rear wheel pads in the state in which the braking-pressure ratio of the front wheel to the rear wheel is set to 1.1:1.0.

Like the result of Test Example 1, the result proves uniform frictional-contact between disks and brake pads of the front wheels and the rear wheels, and as a result, proves uniform wear of the brake pads.

As such, in the condition in which the difference between the average of temperatures of the right and left disks of the front wheel and the average of temperatures of the right and left disks of the rear wheel is greater than the reference value, control of distributing braking pressure to the front wheel and the rear wheel may be performed, and accordingly, wear levels of the brake pads of the front wheels and the rear wheels may be uniformly maintained, thereby enhancing the braking stability of a vehicle.

Needless to say, after control of distributing the braking pressure to the front wheels and the rear wheels is performed, the difference between the average of temperatures of the right and left disks of the front wheel and the average of temperatures of the right and left disks of the rear wheel is compared with the reference value (S109), and when the difference is less than the reference value, control of distributing the braking pressure of the front wheel to the rear wheel may be terminated.

In particular, when control of distribution of braking pressure, such as operation S108, is performed under high deceleration equal to or greater than 0.3 g (g being gravitational acceleration) during vehicle braking, there is a problem in that a vehicle behavior and posture is unstable, and thus, a control procedure of distributing braking pressure to the front wheels and the rear wheels as well as a procedure of calculating a disk temperature may not be performed.

Thus, prior to operation S102, the controller 20 may compare a current deceleration value to be acquired based on the signal obtained by detecting the wheel speed of the front wheels and the rear wheels with a reference value (e.g., 3 g) (S101), and as the comparison result, when verifying that the current deceleration corresponds to a high deceleration equal to or greater than 0.3 g, the controller 20 may execute logic for stopping control of distributing the braking pressure in operations S102 to S109.

In operation S105, after the disk temperature of the front wheels and the rear wheels is calculated, the controller 20 may compare the calculated disk temperature with a preset maximum temperature of the disk (e.g., 550° C.) (S106), and as the comparison result, when determining that the calculated disk temperature is equal to or greater than the maximum temperature of the disk, the controller 20 may warn a driver for preventing a hard braking operation by the driver.

For example, the controller 20 may transmit a signal, corresponding to an instruction to turn on a warning light, to the cluster 30, and may turn on the warning light of the cluster 30, and accordingly, may guide prevention of a hard braking operation of a driver.

Thus, the hard braking operation of the driver may be prevented, and thus, the lifetime of brake components such as a disk may be ensured, and may be extended.

The present disclosure may provide the following effects through the aforementioned solutions.

First, braking force of front and rear wheels may be calculated using a wheel slip ratio of the front and rear wheels and a road surface friction coefficient, a disk temperature of the front wheels and the rear wheels may be accurately estimated and calculated using the calculated braking force, and distribution of braking pressure to the front and rear wheels based on the calculated disk temperature may be controlled such that brake pads are uniformly worn, and accordingly, levels of wear of the brake pads of the front wheels and the rear wheels may be uniformly maintained, thereby enhancing braking stability of the vehicle.

Second, when the calculated disk temperature is increased to a preset maximum temperature or greater, a warning lamp of a cluster may be turned on to warn a driver and simultaneously to prevent a hard braking operation by the driver, thereby extending the lifespan of brake components such as a disk.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A braking control system for a vehicle, comprising:
a wheel speed sensor configured to detect a wheel speed of front wheels and rear wheels; and
a controller configured to sequentially perform calculating a wheel slip ratio based on a wheel speed signal detected by the wheel speed sensor, extracting a road surface friction coefficient matching the calculated wheel slip ratio from mapping table data, calculating braking force of the front wheels and the rear wheels using vehicle data information in addition to the extracted road surface friction coefficient, wherein the vehicle data information includes road friction coefficients of the front wheels and the rear wheels, axial loads of the front and rear wheels, height to a center of gravity of the vehicle from a road surface, a distance between centers of tires of the front and rear wheels, a vehicle weight, deceleration and a front-wheel braking force, calculating temperatures of disks of the front wheels and the rear wheels using the calculated braking force of the front wheels and the rear wheels and a disk temperature estimation formula, and controlling a distribution of braking pressure to the front wheels and the rear wheels based on a calculated temperature difference between the disks of the front wheels and the rear wheels.

2. The braking control system of claim 1, wherein when calculating the braking force of the front wheels and the rear wheels, the controller is configured to calculate the braking force using Equations 2 and 3 below:

$$\mu_{TF} = \frac{F_{xF}}{W_F + \frac{h}{L} \cdot W \cdot a} \quad \text{[Equation 2]}$$

wherein in Equation 2 above, $\mu_{TF}$ is the road surface friction coefficient of the front wheel, $W_F$ is the front wheel axial load, h is the height to the center of gravity of the vehicle from the road surface, L is the distance between centers of tires of the front wheel and the rear wheel, W is the vehicle weight, a is the deceleration, and $F_{xF}$ is the front-wheel braking force, and $$\mu_{TR} = \frac{F_{xR}}{W_R - \frac{h}{L} \cdot W \cdot a} \quad \text{[Equation 3]}$$

wherein in Equation 3 above, $\mu_{TR}$ is the road surface friction coefficient of the rear wheel, $W_R$ is the rear wheel axial load, h is the height to the center of gravity of the vehicle from the road surface, L is the distance between centers of the tires of the front wheel and the rear wheel, W is the vehicle weight, a is the deceleration, and $F_{xR}$ is the rear-wheel braking force.

3. The braking control system of claim 1, wherein the controller is configured to sequentially perform calculating disk braking force energy, calculating disk input energy comprising disk braking force energy, calculating an increased disk temperature, calculating a disk temperature change, and calculating a disk temperature by subtracting the disk temperature change from a previous disk temperature, and is configured to calculate a disk temperature of the front wheels and the rear wheels.

4. The braking control system of claim 3, wherein the disk braking force energy is calculated using Equation 4 below:

Disk braking force energy=front-wheel braking force/(front-wheel braking force+rear-wheel braking force)×total energy [Equation 4]

wherein in Equation 4 above, total energy is kinetic energy (½ ms²) of a vehicle, mass m is a gross vehicle weight (GVW) of the vehicle, and speed S is a value measured by the wheel speed sensor.

5. The braking control system of claim 3, wherein the increased disk temperature is calculated using Equation 6 below:

Increased disk temperature=disk input energy/(disk weight×disk heat capacity). [Equation 6]

6. The braking control system of claim 3, wherein the disk temperature change is calculated using Equation 7 below, a cool disk temperature in Equation 7 below is calculated using Equation 8 below, and a cooling coefficient in Equation 8 below is calculated using Equation 9 below:

Disk temperature change cool disk temperature−increased disk temperature, [Equation 7]

Cool disk temperature=cooling coefficient/(disk weight×disk heat capacity), and [Equation 8]

Cooling coefficient convective heat transfer coefficient×disk cross-sectional area. [Equation 9]

7. The braking control system of claim 1, wherein when a difference between an average of temperatures of right and left disks of the front wheels and an average of temperatures of right and left disks of the rear wheels is greater than a reference value, the controller is configured to control the distribution of the braking pressure to the front wheels and the rear wheels.

8. The braking control system of claim 1, wherein when comparing a deceleration value of a vehicle with a reference value and verifying that the deceleration value corresponds to a high deceleration greater than the reference value, the controller is configured to stop control of the distribution of the braking pressure to the front wheels and the rear wheels.

9. The braking control system of claim 1, wherein after calculating a disk temperature of the front wheels and the rear wheels, when determining that the calculated disk temperature is equal to or greater than a maximum temperature of the disk, the controller is configured to perform control to turn on a warning light of a cluster in order to prevent a hard braking operation by a driver.

10. A braking control method for a vehicle, the method comprising:
    detecting, by a wheel speed sensor, a wheel speed of front wheels and rear wheels;
    calculating, by a controller, a wheel slip ratio based on a wheel speed signal detected by the wheel speed sensor;
    extracting, by the controller, a road surface friction coefficient matching the calculated wheel slip ratio from mapping table data;
    calculating, by the controller, braking force of the front wheels and the rear wheels using vehicle data information in addition to the extracted road surface friction coefficient, wherein the vehicle data information includes road friction coefficients of the front wheels and the rear wheels, axial loads of the front and rear wheels, height to a center of gravity of the vehicle from a road surface, a distance between centers of tires of the front and rear wheels, a vehicle weight, deceleration, and a front-wheel braking force;
    calculating, by the controller, temperatures of disks of the front wheels and the rear wheels using the calculated braking force of the front wheels and the rear wheels and a disk temperature estimation formula; and
    controlling, by the controller, a distribution of braking pressure to the front wheels and the rear wheels based on a calculated temperature difference between the disks of the front wheels and the rear wheels.

11. The method of claim 10, wherein when calculating the braking force of the front wheels and the rear wheels, the braking force is calculated using Equations 2 and 3 below:

$$\mu_{TF} = \frac{F_{xF}}{W_F + \frac{h}{L} \cdot W \cdot a} \quad \text{[Equation 2]}$$

wherein in Equation 2 above, $\mu_{TF}$ is the road surface friction coefficient of the front wheel, $W_F$ is the front wheel axial load, h is the height to the center of gravity of the vehicle from the road surface, L is the distance between centers of tires of the front wheel and the rear wheel, W is the vehicle weight, a is the deceleration, and $F_{xF}$ is the front-wheel braking force, and $$\mu_{TR} = \frac{F_{xR}}{W_R - \frac{h}{L} \cdot W \cdot a} \quad \text{[Equation 3]}$$

wherein in Equation 3 above, $\mu_{TR}$ is the road surface friction coefficient of the rear wheel, $W_R$ is the rear wheel axial load, h is the height to a center of gravity of the vehicle from the road surface, L is the distance between centers of the tires of the front wheel and the rear wheel, W is the vehicle weight, a is the deceleration, and $F_{xR}$ is the rear-wheel braking force.

12. The method of claim 10, wherein calculating the disk temperature of the front wheels and the rear wheels is performed by sequentially performing:
   calculating disk braking force energy;
   calculating disk input energy comprising disk braking force energy;
   calculating an increased disk temperature;
   calculating a disk temperature change; and
   subtracting the disk temperature change from a previous disk temperature.

13. The method of claim 12, wherein the disk braking force energy is calculated using Equation 4 below:

Disk braking force energy=front-wheel braking force/(front-wheel braking force+rear-wheel braking force)×total energy   [Equation 4]

wherein in Equation 4 above, total energy is kinetic energy (½ ms²) of a vehicle, mass m is a gross vehicle weight (GVW) of the vehicle, and speed S is a value measured by the wheel speed sensor.

14. The method of claim 12, wherein the increased disk temperature is calculated using Equation 6 below:

Increased disk temperature=disk input energy/(disk weight×disk heat capacity).   [Equation 6]

15. The method of claim 12, wherein the disk temperature change is calculated using Equation 7 below, a cool disk temperature in Equation 7 below is calculated using Equation 8 below, and a cooling coefficient in Equation 8 below is calculated using Equation 9 below:

Disk temperature change cool disk temperature−increased disk temperature,   [Equation 7]

Cool disk temperature=cooling coefficient/(disk weight×disk heat capacity), and   [Equation 8]

Cooling coefficient convective heat transfer coefficient×disk cross-sectional area.   [Equation 9]

16. The method of claim 10, wherein controlling the distribution of braking pressure to the front wheels and the rear wheels is performed when a difference between an average of temperatures of right and left disks of the front wheels and an average of temperatures of right and left disks of the rear wheels is greater than a reference value.

17. The method of claim 10, further comprising:
   when comparing a deceleration value of a vehicle with a reference value and verifying that the deceleration value corresponds to a high deceleration greater than the reference value,
   stopping control of distribution of the braking pressure to the front wheels and the rear wheels.

18. The method of claim 10, further comprising:
   after calculating a disk temperature of the front wheels and the rear wheels, when determining that the calculated disk temperature is equal to or greater than a maximum temperature of the disk, performing control to turn on a warning light of a cluster in order to prevent a hard braking operation by a driver.

19. A braking control system for a vehicle, comprising:
   a wheel speed sensor configured to detect a wheel speed of front wheels and rear wheels; and
   a controller configured to sequentially perform calculating a wheel slip ratio based on a wheel speed signal detected by the wheel speed sensor, extracting a road surface friction coefficient matching the calculated wheel slip ratio from mapping table data, calculating braking force value of the front wheels and the rear wheels using vehicle data information in addition to the extracted road surface friction coefficient, calculating temperatures of disks of the front wheels and the rear wheels using the calculated braking force value of the front wheels and the rear wheels and a disk temperature estimation formula, and controlling a distribution of braking pressure to the front wheels and the rear wheels based on a calculated temperature difference between the disks of the front wheels and the rear wheels,
   wherein when calculating the braking force value of the front wheels and the rear wheels, the controller is configured to calculate the braking force value using Equations 2 and 3 below:

$$\mu_{TF} = \frac{F_{xF}}{W_F + \frac{h}{L} \cdot W \cdot a} \quad \text{[Equation 2]}$$

wherein in Equation 2 above, $\mu_{TF}$ is a road surface friction coefficient of a front wheel, $W_F$ is a front wheel axial load, h is a height to a center of gravity of a vehicle from a road surface, L is a distance between centers of tires of the front wheel and rear wheel, W is a vehicle weight, a is deceleration, and $F_{xF}$ is a front-wheel braking force, and $$\mu_{TR} = \frac{F_{xR}}{W_R - \frac{h}{L} \cdot W \cdot a} \quad \text{[Equation 3]}$$

wherein in Equation 3 above, $\mu_{TR}$ is a road surface friction coefficient of the rear wheel, $W_R$ is a rear wheel axial load, h is a height to a center of gravity of the vehicle from the road surface, L is a distance between centers of the tires of the front wheel and the rear wheel, W is a vehicle weight, a is deceleration, and $F_{xR}$ is a rear-wheel braking force.

20. A braking control system for a vehicle, comprising:
a wheel speed sensor configured to detect a wheel speed of front wheels and rear wheels; and
a controller configured to sequentially perform calculating a wheel slip ratio based on a wheel speed signal detected by the wheel speed sensor, extracting a road surface friction coefficient matching the calculated wheel slip ratio from mapping table data, calculating braking force value of the front wheels and the rear wheels using vehicle data information in addition to the extracted road surface friction coefficient, calculating temperatures of disks of the front wheels and the rear wheels using the calculated braking force value of the front wheels and the rear wheels and a disk temperature estimation formula, and controlling a distribution of braking pressure to the front wheels and the rear wheels based on a calculated temperature difference between the disks of the front wheels and the rear wheels,
wherein the calculating temperatures of disks of the front wheels and the rear wheels using the calculated braking force value of the front wheels and the rear wheels and a disk temperature estimation formula includes:
a first step of calculating a disk braking force energy using the braking force of the front wheels and the rear wheels,
a second step of calculating a disk input energy including the disk braking force energy as calculated in the first step,
a third step of calculating of an increased disk temperature using a first estimation formula into which the disk input energy calculated is inserted,
a fourth step of calculating a disk temperature change using a second estimation formula into which the increased disk temperature calculated using the first estimation formula is inserted, and
a fifth step of calculating a disk temperature using a third estimation formula into which the disk temperature change calculated using the second formula is inserted.

* * * * *